3,223,723
PROCESS FOR THE PREPARATION OF
CYANOBENZOIC ACID
Roger L. Weichman and William L. Fierce, Crystal Lake, Ill., assignors, by mesne assignments, to Union Oil Company of California, Los Angeles, Calif., a corporation of California
No Drawing. Filed Feb. 21, 1962, Ser. No. 174,707
3 Claims. (Cl. 260—465)

This invention relates to new and useful improvements in processes for the preparation of cyano-substituted aromatic acids, and more particularly to a process for the production of cyanobenzoic acids from tolunitriles.

Tolunitrile is a well-known organic compound which is useful as an intermediate in the preparation of toluic acid and other organic compounds. Cyanobenzoic acid (which exists in the form of ortho, meta, and para isomers) is a well-known organic compound which is useful in the preparation of phthalic acids and other similar derivatives. In the past, cyanobenzoic acid has been prepared by a variety of reactions, some of which use tolunitrile as a starting material. Tolunitrile has been oxidized with air at elevated temperatures to yield cyanobenzoic acid in moderate yields, e.g., about 50–60%, see British Patent 764,110 and Italian Patent 525,199. Tolunitrile has been oxidized with chromic acid in a mixture of acetic and sulfuric acids to yield relatively small amounts of cyanobenzoic acid, JACS 73, 2854 (1951). In general, the prior art processes for preparation of cyanobenzoic acids have been somewhat involved, usually have required several steps, and in general have produced unsatisfactory yields.

It is therefore one object of this invention to provide a new and improved method for the preparation of cyanobenzoic acids from tolunitriles.

Another object of this invention is the provision of an improved process for the oxidation of tolunitriles to cyanobenzoic acids.

A feature of this invention is the provision of an improved process wherein tolunitriles are oxidized with nitrogen dioxide at a temperature of about 50°–150° C. under a superatmospheric pressure sufficient to maintain the reactants in the liquid phase.

Other objects and features of this invention will become apparent from time to time throughout the specification and claims as hereinafter related.

This invention is based upon our discovery that tolunitriles can be oxidized to cyanobenzoic acids with nitrogen dioxide at temperatures in the range from about 50° to 150° C. in high yield and with substantially no formation of nitro derivatives. This process must be carried out under a superatmospheric pressure (preferably in a pressure vessel or bomb) sufficient to maintain the reactants in the liquid phase. When the reaction is carried out at elevated temperatures, in excess of 150° C., at atmospheric pressure the yields of cyanobenzoic acids are relatively poor and there is a substantial formation of nitro-derivatives. At lower temperatures, nitration is not so severe but the conversion of tolunitrile to cyanobenzoic acids is negligible. When reaction is attempted at higher pressures, it is found that at temperatures less than about 50° C. little or no reaction takes place, while at temperatures in excess of about 150° C. there is a substantial formation of nitro-derivatives.

In carrying out this process, the reaction is preferably carried out in an inert solvent. Solvents which can be used in this process include any inert solvent in which the nitrile is soluble and which is not attacked by the nitrogen dioxide. Solvents which can be used in the process include the following but are not limited thereto: o-dichlorobenzene, chlorobenzene, carbon tetrachloride, 1,1,1-trichloroethane, hexane, heptane, decane, nitromethane and nitroethane. One of the tolunitriles or a mixture of the tolunitriles is charged to a pressure reactor in admixture with a suitable inert solvent, and the vessel is charged with liquid or solid nitrogen dioxide at a temperature somewhat below the boiling point of nitrogen dioxide, e.g., about −10° C. The vessel is closed and heated to reaction temperature in the range from about 50° to 150° C. and maintained at that temperature until the reaction is complete, as evidenced by the pressure in the reaction vessel becoming constant. In carrying out this process the relative proportions of the reactants is not particularly critical, although it is generally preferred to use a stoichiometric deficiency of nitrogen dioxide to avoid a tendency for formation of nitro-derivatives.

The following non-limiting examples are illustrative of the scope of this invention.

*Example I*

A 500-ml. flask equipped with water-cooled condenser, fritted-glass bubbler, thermometer, and mercury-sealed stirrer, was charged with 10.0 g. of p-tolunitrile and 150 ml. of o-dichlorobenzene and heated to reflux (172° C.). A gaseous mixture of nitrogen dioxide (43.5 cc./min.) and helium (25 cc./min.) was bubbled through the stirred mixture for 125 minutes. The presence of the brown color of nitrogen dioxide in the flask and in the condenser throughout the run showed that nitrogen dioxide was not being consumed quantitatively in the reaction. On cooling, 1.6 g. of a white solid settled out of the orange solution. This solid melted at 206–209° C., had a molecular weight of 150, and had strong —CN and —COOH bands in its infrared spectrum. Based on melting point, molecular weight, and infrared spectrum, the solid was determined to be a crude mixture containing about 93% p-cyanobenzoic acid.

The liquid residue from the reactor was extracted with caustic, followed by acidification of the caustic washes to yield 0.27 g. of a dirty gray-white solid melting at 90°–93° C. The melting point of this solid corresponded to that of nitrated p-tolunitrile.

The acidified caustic washes were then extracted with ether which yielded, upon evaporation 0.97 g. of a light yellow solid. This solid melted in the range from about 188° to 200° C. and had a molecular weight of 170. The solid was probably a mixture of p-cyanobenzoic acid and nitro-p-tolunitrile. Based on its molecular weight, the solid was about 48% p-cyanobenzoic acid. The total amount of p-cyanobenzoic acid obtained in this reaction represented a yield of about 18%, based on the nitrogen dioxide charged to the reaction.

*Example II*

A 90-ml. glass reactor, fitted with a valve and a pressure gauge, was cooled to about −10° C. and charged with 10.3 g. of p-tolunitrile, 42 ml. of o-dichlorobenzene, and 10.7 g. of liquid nitrogen dioxide. The reactants were completely miscible. The reactor was allowed to warm up to room temperature and to stand for 11 days. The pressure gradually increased from zero p.s.i.g. on the first day to 17 p.s.i.g. on the eleventh day. Only a very small amount of solid formed during this time. The product was extracted with caustic and the caustic washes were acidified. Extraction of the acidified caustic washes with ether, followed by evaporation of the ether, yielded 0.6 g. of a yellow solid melting at 185°–190° C. This solid was a crude mixture containing about 50% p-cyanobenzoic acid. The total yield of p-cyanobenzoic acid was about 3.3%, based on the nitrogen dioxide charged to the reaction (nitrogen dioxide was the limiting reactant in this reaction).

Example III

A 200-ml. stainless steel reactor, equipped with a valve and a pressure gauge, was cooled to about −10° C. and charged with 10.7 g. of p-tolunitrile, 42 ml. of o-dichlorobenzene, and 10.1 g. of nitrogen dioxide. The reactants were completely miscible. The reactor was then heated in a white-oil bath to a temperature of 100° C. and maintained at that temperature for a period of 46 hours. At the end of about 40 hours the pressure become constant at 362 p.s.i.g., indicating probable completion of reaction. After cooling to room temperature and venting, the reactor was found to contain a dark green liquid and a considerable amount of solid material. Filtration of the contents of the reactor yielded 10.23 g. of a light-greenish-white solid which melted at about 205° C. This solid had strong —CN and —COOH bands in its infrared spectrum, and had a molecular weight of 150. Based on molecular weight and infrared analysis, the product was determined to be a crude mixture containing 93% p-cyanobenzoic acid.

The liquid product was partially evaporated to yield additional solids and was extracted with caustic as in the previous examples. The caustic-extract material was acidified and extracted with ether as in the previous examples to yield additional solid material which contained both nitro p-tolunitrile and p-cyanobenzoic acid.

The p-cyanobenzoic acid yield, calculated from the solid precipitate obtained from the reactor, was about 88.5% based on the limiting reactant, nitrogen dioxide. This value is somewhat lower than the actual yield because it is based only on the initial solid product and does not include the cyanobenzoic acid present in the solids obtained from the subsequent treatment of the liquid residue in the reactor. In this run a very good yield of p-cyanobenzoic acid was obtained with very little formation of nitro-derivatives.

Example IV

A 100-ml. stainless steel reactor equipped with a valve and a 1000-lb. pressure gauge is cooled to about −10° C., and charged with 6 g. of m-tolunitrile, 30 ml. of n-decane, and 6 g. of nitrogen dioxide. The reactor is then heated at 140° C. in an oil bath for a period of about 50 hours. The pressure becomes constant at about 570 p.s.i.g. after about 40 hours. Upon cooling to room temperature and venting, the reactor is found to contain considerable solid product. Filtration of the solid product yields a light-colored solid which melts at about 207° C. This product has a molecular weight of about 150 and is crude m-cyanobenzoic acid in a yield of about 90%, based on the nitrogen dioxide charged.

Example V

A 100-ml. stainless steel reactor equipped with a valve and a 1000-lb. pressure gauge is cooled to about −10° C., and charged with 6 g. of o-tolunitrile, 30 ml. of carbon tetrachloride, and 6 g. of nitrogen dioxide. The reactor is then heated at 140° C. in an oil bath for a period of about 50 hours. The pressure becomes constant at about 570 p.s.i.g. after about 40 hours. Upon cooling to room temperature and venting, the reactor is found to contain considerable solid product. Filtration of the solid product yields a light-colored solid which melts at about 180° C. This product has a molecular weight of about 150 and is crude o-cyanobenzoic acid in a yield of about 90%, based on the nitrogen dioxide charged.

From the experiments which we have carried out we have found that cyanobenzoic acids can be prepared in good yield from tolunitriles by oxidation with nitrogen dioxide at temperatures in the range from about 50° to 150° C. under a superatmospheric pressure sufficient to maintain the reactants in the liquid phase. The reaction is preferably carried out using an inert solvent for the reactants and using a pressure-reactor or bomb. The yield of cyanobenzoic acid is unexpectedly high in this process and in fact is much higher than is obtained at higher reaction temperatures using nitrogen dioxide as the oxidizer at atmospheric pressure. By carrying this process out in the temperature range from about 50° to 150° C. and at relatively high pressure, it is possible to obtain high yields of cyanobenzoic acids with little or no formation of nitro-derivatives. The yields which are obtained in this manner are better than are obtained using other well-known oxidizing agents; and the absence of nitro-derivatives is very unexpected in view of the fact that nitrogen dioxide at elevated temperatures and pressures is an exceptionally good nitrating agent.

While we have described our invention fully and completely with special emphasis upon several preferred embodiments thereof, we wish it to be understood that within the scope of the appended claims this invention may be practiced otherwise than as specifically described herein.

The embodiments of the invention in which an exclusive property or privilege is claimed are defined as follows:

1. A method of preparing cyanobenzoic acid which consists in reacting tolunitrile with nitrogen dioxide in the presence of a solvent selected from the group consisting of dichlorobenzene, chlorobenzene, carbon tetrachloride, 1,1,1-trichloroethane, hexane, heptane, decane, nitromethane and nitroethane at a temperature of about 50°–150° C. under superatmospheric pressure sufficient to maintain the reactants in the liquid phase.

2. A method in accordance with claim 1 in which the nitrile reactant is p-tolunitrile and the product is p-cyanobenzoic acid.

3. A process for preparing cyanobenzoic acid which consists in reacting p-tolunitrile dissolved in o-dichlorobenzene with nitrogen dioxide at a temperature of about 100° C. under superatmospheric pressure sufficient to maintain a liquid phase reaction mixture.

References Cited by the Examiner

UNITED STATES PATENTS

| | | | |
|---|---|---|---|
| 2,744,925 | 5/1956 | Toland | 260—465 |
| 3,159,672 | 12/1964 | Derbyshire et al. | 260—465 XR |

FOREIGN PATENTS

| | | |
|---|---|---|
| 792,199 | 3/1958 | Great Britain. |
| 823,437 | 11/1959 | Great Britain. |

CHARLES B. PARKER, *Primary Examiner.*